United States Patent [19]

Flatau

[11] Patent Number: 4,539,911
[45] Date of Patent: Sep. 10, 1985

[54] PROJECTILE
[75] Inventor: Abraham Flatau, Joppa, Md.
[73] Assignee: The United States of America as represented by the Secretary of the Army, Washington, D.C.
[21] Appl. No.: 335,306
[22] Filed: Dec. 28, 1981

Related U.S. Application Data

[63] Continuation-in-part of Ser. No. 050,288, Jun. 20, 1979, abandoned.

[51] Int. Cl.³ .............................................. F42B 13/00
[52] U.S. Cl. .................................. 102/374; 102/503; 102/529
[58] Field of Search ............... 102/374, 376, 380, 381, 102/444, 445, 498, 501, 503, 513, 520, 521, 522, 523; 60/243, 245, 241

[56] References Cited

U.S. PATENT DOCUMENTS

| | | | |
|---|---|---|---|
| 2,793,590 | 5/1957 | Brandt | 102/444 |
| 2,799,987 | 7/1957 | Chandler | 60/245 |
| 2,989,922 | 6/1961 | Greenwood et al. | 102/380 |
| 3,024,729 | 3/1962 | Kluge | 102/503 |
| 3,875,864 | 4/1975 | Ambrosini et al. | 102/513 |
| 4,148,259 | 4/1979 | Yuhash | 102/522 |
| 4,177,733 | 12/1979 | Romer et al. | 102/503 |

Primary Examiner—Harold J. Tudor
Assistant Examiner—Tyrone Davis
Attorney, Agent, or Firm—Anthony T. Lane; Robert P. Gibson; Edward F. Costigan

[57] ABSTRACT

A projectile is adapted to be launched from a barrel. The projectile includes a tubular housing and a structural member. The tubular housing has a forward inlet throat and aft nozzle. An annular layer of solid fuel combustible material is mounted within the housing between the inlet throat and nozzle. The structural member is detachably mounted over the nozzle. The structural member is sized to cover the nozzle so that pressurized gas applied to the structural member forwardly thrusts the housing. Thus, the projectile is gun-launchable and can produce a ramjet action.

7 Claims, 7 Drawing Figures

PROJECTILE

GOVERNMENTAL INTEREST

The invention described herein may be manufactured, used and licensed by or for the Government for governmental purposes without the payment to me of any royalties thereon.

CROSS-REFERENCE TO RELATED APPLICATION

This application is a continuation-in-part of copending Application, Serial No. 050,288, filed June 20, 1979 abandoned.

BACKGROUND OF THE INVENTION

The present invention relates to projectiles and in particular to projectiles having a tubular housing.

It is known to equip a missile with propulsion systems such as a ramjet. This known missile is initially launched by a rocket to a speed sufficient to initiate operation of the ramjet. This known missile is not a tubular device fired from a barrel, but is instead part of a larger warhead delivery system. Simple tubular projectiles are also known. However, such projectiles have inherently limited range due to their aerodynamic characteristics. A known tubular projectile includes a ramjet fueled by internal liquid fuel. However, it requires conduits and pressurized tanks and is therefore relatively heavy and complicated. Recently, solid fuel propellants have been employed in ramjets, but primarily for missiles driven by an integral rocket ramjet.

The present invention provides a simple and aerodynamically stable projectile by employing a tubular housing having an internal layer of combustible material. The projectile is launched through a barrel by means of a structural member that detaches after launch. In the disclosed embodiment the structural member is an obturator-sabot containing a pusher. Once launched, supersonic airflow entering the tubular housing is decelerated, compressed and therefore heated. This event ignites the layer of combustible material causing thrust by means of a ramjet action.

By employing such an arrangement, a gun-launchable projectile is provided which has unique characteristics by virtue of its ramjet-produced thrust. An important application for such a device is as a practice round for simulating the time and spatial flight characteristics of a combat service projectile.

Simulation of APFSDS projectiles (armor piercing fin stabilizied, discarding sabot projectile) is difficult to achieve safely because of its high density, inherently high ballistic coefficient and low velocity decay. A conventional scaling approach to simulation would result in a practice round which is so dense or heavy that the practice round is nearly as lethal as the actual combat service projectile. When use is made of a scarce target, such as an obsolete or worn-out tank, it is important to avoid immediate destruction of such a target by an energetic and lethal practice round. It is also important to limit the range of the practice round because of the limited real estate available for test purposes.

A disclosed embodiment of the present invention avoids the foregoing problems with a light projectile that produces thrust. Instead of using large masses or high densities to simulate a given ballistic coefficient, thrust is produced at a magnitude slightly less than the associated aerodynamic drag, in one embodiment. Thus, the relatively small velocity decay of a heavy projectile is simulated by a significantly lighter projectile. Moreover, the range of projectiles incorporating principles of the present invention can be limited according to the quantity and burn time of the ramjet fuel. Once this fuel is expended, the high aerodynamic drag associated with the tubular housing of the disclosed embodiment causes it to fail. Thus, a relatively light practice round incorporating principles of the present invention can be safely fired at rated muzzle velocity on a relatively small practice range without causing excessive damage to a target. Using such an arrangement, the projectile weight can be reduced by a factor of ⅛ to 1/10 while the effective kinetic energy is reduced by a factor of 1/10 to 1/14.

In a preferred embodiment used as a practice round, the nose of the projectile is made of a frangible honeycomb material to reduce the initial impact upon a target.

Also, in a preferred embodiment, a discarding sabot is employed to allow the firing of a sub-caliber practice round. Employing such a sub-caliber round results in a less massive and consequently less lethal projectile.

Furthermore, other embodiments can be designed as an air defense round. The tubular housing and ramjet fuel can be arranged so that the housing and its internal combustion products pierce and explode within a target. In such an embodiment, the ramjet thrust can be set equal to or, preferably, greater than the aerodynamic drag to reduce the transit time.

SUMMARY OF THE INVENTION

In accordance with the illustrative embodiments demonstrating features and advantages of the present invention, there is provided a projectile adapted to be launched from a barrel. The projectile includes a tubular housing and a structural member. The tubular housing has a forward inlet throat and an aft nozzle. An annular layer of combustible material is mounted within the housing between the inlet throat and nozzle. The structural member is detachably mounted over the nozzle. This structural member is sized to cover the nozzle so that pressurized gas applied to the structural member forwardly thrusts the housing. Thus, the projectile is gun-launchable and can produce a ramject action.

BRIEF DESCRIPTION OF THE DRAWING

The above brief description as well as further objects, features and advantages of the present invention will be more fully appreciated by reference to the following detailed description of presently preferred, but nonetheless illustrative embodiments in accordance with the present invention when taken in conjunction with the accompanying drawings wherein.

DETAILED DESCRIPTION OF THE PREFERRED EMBODIMENTS

Figure 1:
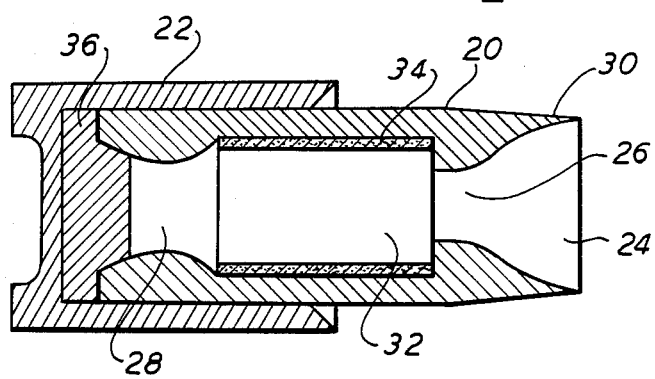
FIG. 1 is a sectional view of a projectile in accordance with the present invention.

Referring to FIG. 1, there is shown a projectile comprising a tubular housing 20. Coaxially mounted on housing 20 is a structural member that is cup-shaped; shown herein as shell 22. Tubular housing 20 is fabricated preferably of metal, but for embodiments used as a practice round, its nose may be constructed of a light frangible honeycomb material. Housing 20 is arranged with an air inlet comprising outer airway 24 and inner airway throat portion 26 which terminates at a throat having a predetermined cross-sectional area. The walls of airways 24 and 26 converge inwardly. The walls of airways 24 and 26 are curved and form a surface of revolution, although more complex shapes may be employed instead. The specific shape for outer airway 24 is selected to provide progressive compression of air within airway 24 as the projectile of FIG. 2 moves forward (in this Figure, from left to right at supersonic speeds). Airways 24 and 26 are arranged to act as a well-known diffuser. Being bell-shaped, they propogate numerous oblique shock waves that weaken the normal shock wave. This feature reduces overall energy loss through the irreversible shock wave process. The specific surfaces and design parameters for providing air compression at an inlet port in a supersonic air stream are known to persons skilled in the ramjet art.

Tubular housing 20 also has formed at its aft face nozzle 28.

The outside surface of housing 20 is essentially cylindrical, except that forward portion 30 tapers inward slightly toward the mouth of airway 24 where it forms a sharp leading edge defining a forward-facing circular discoidal-shaped inlet having a predetermined cross-sectional area for inlet airflow. It is to be understood that the specific dimensions and shapes of the various surfaces of housing 20 can be designed to accommodate the desired thrust, weight and flight stability, in accordance with known aerodynamic principles. However, for adequate compression to produce effective ramjet thrust, it is necessary that the cross-sectional area of the throat portion be not less than 0.6 of the inlet area defined by the circular leading edge inlet and that the distance between these two mentioned areas along the center axis not be less than the diameter of the inlet.

Contiguous between nozzle 28 and airway 26, there if formed in housing 20, chamber 32. Chamber 32 is a cylindrical combustion chamber having a constant predetermined diameter and lined with uniform annular layer of solid fuel material 34. Having different inside diameters, the junction of chamber 32 and the throat portion of airway 26 provides a rearward-facing step that stabilizes flames because the majority of inlet air will keep the same cross-section as the inlet throat. Hence, this step provides a controlled recirculation zone which improves flameholding since supersonic inlet airflow does not impact the combustion material. The thickness and composition of layer 34 is selected to provide the desired burning interval and thrust. In some embodiments, the combustion gases of layer 34 are chemically enhanced to leave a bright visible trace of the trajectory following exit from the nozzle.

Member 22 is a hollow plastic or metallic cylinder which is closed at its aft end. Cylinder 22 acts as an obturator by engaging barrel rifling or the barrel's internal surfaces, such as the rifling of barrel 6 seen in FIG. 3 of U.S. Pat. No. 2,674,923. Cylinder 22 also seals off the expanding gases produced by the burning propellant from the projectile's cartridge case. Cylinder 22, also known in the art as a discarding sabot, is employed to fire a sub-caliber round in an operatively related gun barrel. In a known manner, obturator-sabot 22 imparts a spin to housing 20 when they are launched from a rifled barrel.

Disc 36 is coaxially mounted between sabot 22 and housing 20. Disc 36 is essentially a cylindrical body capped with a frustumconical section of a reduced diameter. The specific contour of disc 36 is chosen to match the inside surface of nozzle 28. Arranged in this fashion, disc 36 acts as a pusher to forwardly impel housing 20 when the propellant gas pressure originating from the cartridge case produces a force on the back surface of obturator member 22.

Figure 2:
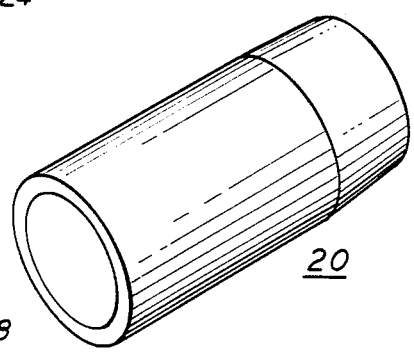
FIG. 2 is an isometric view of the projectile of FIG. 1.

Referring to FIG. 2, an isometric view of housing 20 is shown. This Figure shows the appearance of housing 20 when it is in free flight and its sabot has been discarded.

Figure 3:
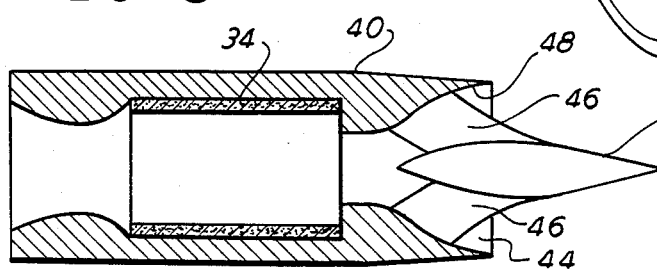
FIG. 3 is an alternate embodiment for the housing shown in FIG. 1.

Referring to FIG. 3, an alternative embodiment for the housing of FIG. 1 is shown. Housing 40 includes solid fuel layer 34 which is arranged identically to the similarly numbered layer of FIG. 2. The shape of housing 40 is the same as shown for FIG. 1, except that it includes inlet spike 42. Spike 42 is mounted to the inside surface 48 of airway 44 by means of radially projecting struts 46. Spike 42 is solid of revolution shaped in a well-known manner to create an oblique shock wave that reduces the energy loss that might occur if inlet air was compressed entirely through a single normal shock wave.

Figure 4:
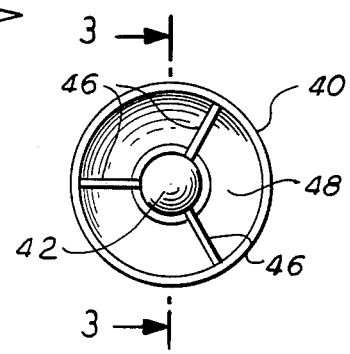
FIG. 4 is a front view of the housing of FIG. 3.

Referring to FIG. 4, a front view of housing 40 of FIG. 4 is shown. In this Figure, three radially projecting struts 46 are more clearly shown. As illustrated herein, struts 46 are attached to equiangular positions of spike 42.

Figure 5:
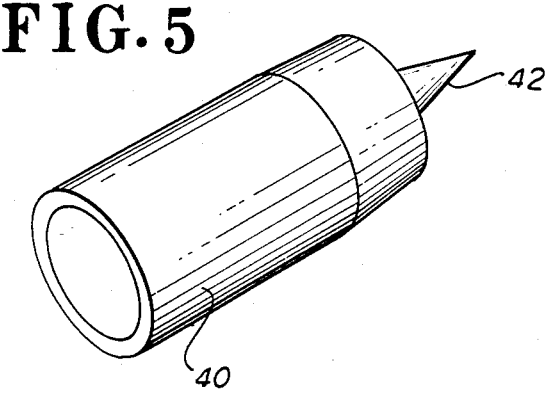
FIG. 5 is an isometric view of the housing of FIG. 3.

Referring to FIG. 5, an isometric view of the housing of FIGS. 3 and 4 is shown.

Figure 6:
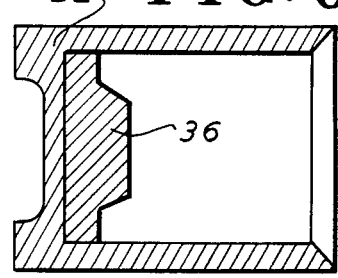
FIG. 6 is a sectional view of the structural member of FIG. 1.

FIG. 6 is a detail drawing of sabot 22 and disc 36, which were previously illustrated in connection with FIG. 1.

Figure 7:
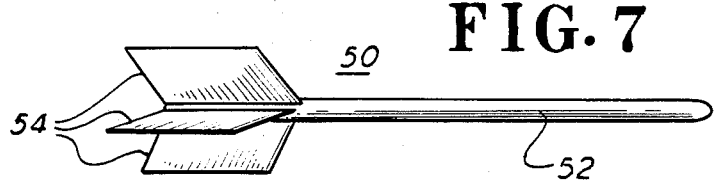
FIG. 7 is an isometric view of a known armor piercing projectile.

Referring to FIG. 7, there is shown armor piercing projectile 50 which is known in the prior art. This projectile comprises a relatively massive core 52 and a plurality of stabilizing fins 54 which project radially outward from the rear section of core 52. This projectile is designed to destroy a target primarily by the impulse produced upon the collision of core 52 and the target. Essentially, the conversion of the kinetic energy of core 52 provides the destructive force.

To facilitate an understanding of the principles associated with the above projectiles, their operation will be briefly described. It is to be understood that the operation of the projectiles of FIGS. 1 and 3 are similar except as noted hereinafter.

The projectile shown in FIG. 1 has its sabot 22 fitted onto a known cartridge (not shown) containing propellant. Such assembly is then loaded into the breech of a rifled barrel (not shown) in the usual fashion. Alternatively, the projectile of FIG. 1 can be separately loaded into the breech of a barrel before the loading of a propellant charge.

After loading, the propellant charge is ignited, causing sabot 22 and housing 20 to accelerate. Sabot 22 acts as an obturator which engages the rifling of the launching barrel to spin the projectile. Accordingly, the spinning projectile is launched at a supersonic muzzle velocity.

Upon exiting the muzzle, centrifugal force causes sabot 22 to spread outwardly. Simultaneously, aerodynamic drag bearing on the forward face of sabot 22 causes it to separate from housing 20. At this time the supersonic velocity of housing 20 causes air entering the convergent inlet bounded by the curved surface of airway 24 to be violently compressed and heated. Such compressed and heated air is conducted through airway 26 into combustion chamber 32. This heated air ignites solid fuel layer 34. For the projectile of FIG. 3 the compressive heating of air is also facilitated by the oblique shock wave, caused by spike 42. This oblique shock wave weakens the normal shock wave occurring within airway 44, thereby reducing overall energy lost in the shock wave process. The net effect of the foregoing is to increase the enthalpy and entropy of the air-combustion system.

As a result, the high termperature gases expand in the process of flowing through nozzle 28 and are emitted at extremely high velocity. This produces thrust.

Accordingly, shortly after launch housing 20 travels as a tubular device thrusted by a ramjet action.

For those embodiments which are employed as a practice round, the thrust is slightly less than the aerodynamic drag. Because of such thrust, housing 20 travels on a trajectory similar to that of a heavier projectile. In considering trajectories, it is to be appreciated that the trajectory of any projectile is affected to great extent by its ballistic coefficient $C_B$, which is defined as:

$$C_B = w/C_D A$$

where W is the projectile's weight, $C_D$ is its drag coefficient, and A is its cross-sectional area. To simulate the trajectory of an armor-piercing weapon such as that shown in FIG. 7, account must be taken of its high density. Being fabricated as a slender rod of extremely dense tungsten alloy, it consequently has a very high ratio of weight to cross-sectional area. While the consequently large ballistic coefficient could be matched by using similarly dense or heavy materials, this approach results in a practice round that is almost as lethal as the actual weapon. Therefore, a heavy or dense practice round would be very energetic and would endanger a large area.

Housing 20 (FIG. 1), however, achieves a ballistic coefficient simulating that of a heavier projectile by effectively reducing its drag coefficient $C_D$. The drag coefficient, being related to the air resistance opposing the foward motion of a projectile, is effectively reduced by the thrust applied to housing 20 (FIG. 1). This thrust opposes and tends to cancel such air drag. By properly selecting this thrust, the projectile velocity can be made to decay in a manner simulating the velocity decay of a heavier projectile. Thus, by launching the projectile of FIG. 1 at the same muzzle velocity as the heavier projectile, the lighter practice round can match the time and spatial characteristics of the heavier projectile. It is expected that a good trajectory match is provided by applying a nearly constant thrust to housing 20 (FIG. 1). However, it is anticipated that for some embodiments, solid fuel material 34 will be stratified to produce time-varying thrust.

Housing 20 continues on the foregoing trajectory until its solid fuel material is consumed. At that time, the aerodynamic drag becomes a predominant force. In this condition, tubular housing 20 decelerates rapidly and falls. Thus the range of housing 20 is effectively limited by the time interval during which the layer of solid fuel material 34 is burning.

It is appreciated that modifications and alterations can be implemented with respect to the apparatus just described. For example, the shape of the various surfaces can be altered to produce the desired thrust and burn time. Furthermore, the materials may be chosen to provide the desired aerodynamic stability, weight, etc. In addition, various solid fuel materials of different thicknesses and composition may be employed to provide the desired thrust, trajectory and range.

Obviously many other modifications and variations of the present invention are possible in light of the above teachings. For example, the disclosed sabot and disc may have aligned apertures which pass gun gas into the ramjet combustion chamber. This feature allows early ignition of the ramjet fuel, assuring immediate initiation of ramjet operation. Other variations for smooth bore operation will be apparent to skilled practitioners. It is therefore to be understood that within the scope of the appended claims, the invention may be practiced otherwise than specifically described.

I claim:
1. A ramjet projectile adapted to be launched from a gun barrel, consisting of:
   a tubular housing having a forward air inlet with a throat, an aft nozzle, and a generally cylindrical combustion chamber contiguous therebetween
   said inlet having a throat with a first predetermined cross-sectional area,
   said forward air inlet having a sharp leading edge defining a forward-facing circular discoidal-shaped inlet with a second predetermined cross-sectional area,
   said first area being at least 0.6 of said second area,
   an annular layer of solid combustible material mounted in said housing between said inlet throat and said nozzle, and
   said combustion chamber having a cross-sectional area larger than said first predetermined cross-sectional area.

2. A projectile according to claim 1 wherein said forward air inlet comprises an outer airway having rearwardly converging interior walls adapted to provide compression and heating of air at said airway sufficient to ignite and maintain combustion of said layer of combustible material upon launching of said projectile at supersonic velocity.

3. A projectile according to claim 2 wherein said nozzle is adapted to increase the downstream velocity of combustion gas of said combustible material above its velocity without said nozzle.

4. A projectile according to claim 3 wherein said layer of combustible material is of a composition and thickness adapted to provide a trajectory initially simulating that of a predetermined heavier object.

5. A projectile according to claim 4 wherein said layer of combustible material is adapted to finish combustion within a predetermined interval, whereby the range of said housing is limited.

6. A projectile according to claim 5 wherein said layer of combustible material includes a chemical enhancer to provide an observable trace of the trajectory of said housing.

7. A lightweight ramjet training projectile for ballistically simulating an armor-piercing combat projectile having a ballistic coefficient $C_B$ according to the relationship:

$$C_B = W/C_D A$$

Wherein:
W = The combat projectile total weight
$C_D$ = The combat projectile drag coefficient and
A = The combat projectile cross-sectioned area,
said lightweight training projectile consisting of:
  a hollow cylindrical tubular housing having a forward inlet throat forms a surface of revolution, an aft nozzle, and a cylindrical combustion chamber contiguous therebetween having an inside diameter larger than said forward inlet throat, forming a rearward-facing step,
  an annular layer of combustible material mounted in said combustion chamber within said housing between said inlet throat and nozzle, and
  a structural member detachably mounted over said nozzle, said structural member being adapted to cover said nozzle, said lightweight training projectile having a total weight less than the weight of said combat projectile, and a substantially constant ramjet thrust less than its aerodynamic drag so that its ballistic coefficient $C_B$ of said training projectile according to above formula is equivalent to the ballistic coefficient $C_B$ of said combat projectile.

* * * * *